United States Patent
Segal

(10) Patent No.: US 10,820,143 B2
(45) Date of Patent: Oct. 27, 2020

(54) RULE DEVIATION CONFIGURATION FOR OFFENDER MONITORING DEVICES

(71) Applicant: ATTENTI ELECTRONIC MONITORING LTD., Tel Aviv (IL)

(72) Inventor: David Solomon Segal, Palm Harbor, FL (US)

(73) Assignee: ATTENTI ELECTRONIC MONITORING LTD, Tel Aviv (IL)

( * ) Notice: Subject to any disclaimer, the term of this patent is extended or adjusted under 35 U.S.C. 154(b) by 0 days.

(21) Appl. No.: 16/603,253

(22) PCT Filed: Mar. 29, 2018

(86) PCT No.: PCT/IL2018/050376
§ 371 (c)(1),
(2) Date: Oct. 7, 2019

(87) PCT Pub. No.: WO2018/185750
PCT Pub. Date: Oct. 11, 2018

(65) Prior Publication Data
US 2020/0154232 A1    May 14, 2020

Related U.S. Application Data

(60) Provisional application No. 62/483,225, filed on Apr. 7, 2017.

(51) Int. Cl.
| | |
|---|---|
| *H04W 4/021* | (2018.01) |
| *H04W 4/029* | (2018.01) |
| *G06F 21/31* | (2013.01) |
| *G06Q 50/26* | (2012.01) |
| *H04W 4/20* | (2018.01) |
| *G06F 1/3212* | (2019.01) |

(52) U.S. Cl.
CPC ........... *H04W 4/021* (2013.01); *G06F 21/31* (2013.01); *G06Q 50/26* (2013.01); *H04W 4/029* (2018.02); *H04W 4/20* (2013.01); *G06F 1/3212* (2013.01)

(58) Field of Classification Search
CPC ....... H04W 4/02; H04W 4/021; H04W 4/029; H04W 4/20; H04W 12/06; H04W 12/08; G06F 21/31; G06F 1/3212; G06Q 50/26; H04L 67/12; H04L 67/306; H04L 63/0428
See application file for complete search history.

(56) References Cited

U.S. PATENT DOCUMENTS 7,202,814 B2    4/2007 Caspi et al.
2016/0227361 A1 *  8/2016 Booth ................ G08B 21/0446

* cited by examiner

*Primary Examiner* — Orlando Bousono
(74) *Attorney, Agent, or Firm* — Soroker Agmon Nordman

(57) ABSTRACT

According to aspects of this disclosure, a monitored person, via an end-user computing device, may generate a rule deviation request and send the rule deviation request to the computing system of the supervising agency. Based on the received request, the computing system may, upon receiving an indication that the request is authorized, determine a reconfigured rule and enforce the reconfigured rule. In some instances, the computing system may be configured to suppress an alert that would have been generated based on an activity prohibited by initial rule but that is permitted by the reconfigured rule. The reconfigured rule may remain in effect for a duration specified by the request. In this way, the techniques may increase the efficiency with which rule deviation requests are processed and enforced.

19 Claims, 7 Drawing Sheets

RULE DEVIATION CONFIGURATION FOR OFFENDER MONITORING DEVICES

TECHNICAL FIELD

This disclosure relates to information systems for tracking geospatial location information related to monitored persons or objects.

BACKGROUND

Released criminal offenders on community supervision, either probation or parole, may be monitored with body-worn tracking devices (BWTDs) by a criminal justice supervising agency, such as a department of corrections or local law enforcement. The monitoring is based on a sentence, and often includes restricted regions and permissible regions with a schedule for the day of the week and a range of times associated with those areas when the released criminal offender is required to be or required not to be in those areas. A released criminal offender's geospatial location at a given date and time is monitored and recorded by tracking devices worn or carried by the released criminal offender. This geospatial information, including date and time information, can be used to determine a released criminal offender's compliance with their sentence. Activities of released criminal offenders can be reported to the criminal justice supervising agency or to a probation or parole officer by fax, page, text message or email generated by a monitoring center unique to the criminal justice supervising agency.

SUMMARY

Techniques of this disclosure are directed to rule deviation requests for body-worn tracking devices (BWTDs). For example, a BWTD may have an associated set of rules that define prohibited activities or behaviors for a monitored person wearing the BWTD. The BWTD or a computing system of a supervising agency may generate an alert based on data from the BWTD that does not conform to the rules. A computing system of a supervising agency may typically be responsible for managing the rules, e.g., by receiving input from an administrator of the supervising agency.

According to aspects of this disclosure, a monitored person, via an end-user computing device, may generate a rule deviation request and send the rule deviation request to the computing system of the supervising agency. Based on the received request, the computing system may, upon receiving an indication that the request is authorized, determine a reconfigured rule and enforce the reconfigured rule. The reconfigured rule may also be referred to herein as an exception. In some instances, the computing system and/or the BWTD may be configured to suppress an alert that would have been generated based on an activity prohibited by initial rule but that is permitted by the reconfigured rule. The reconfigured rule may remain in effect for a duration specified by the request. In this way, the techniques may increase the efficiency with which rule deviation requests are processed and enforced.

In an example, a system comprises: at least one body-worn tracking device (BWTD) configured to transmit characteristic data that indicates one or more characteristics of the at least one BWTD; and a computing system configured to communicate with the at least one BWTD and an end-user computing device associated with a user of the at least on BWTD, the computing system comprising: a memory configured to store a set of alert rules associated with the at least on BWTD, wherein the set of alert rules establish first limitations for the characteristic data such that the computing system generates a first alert when the characteristic data violates the first limitations; a communication unit configured to receive, from the end-user computing device, a rule deviation request to deviate from at least one rule of the set of rules, wherein the rule deviation request specifies a duration for deviation from the at least one rule; and one or more processors configured to: determine, based on the rule deviation request received by the communication unit, a reconfigured rule corresponding to the at least one rule, wherein the reconfigured rule establishes second limitations for the characteristic data that are different from the first limitations for the duration; identify characteristic data that has been received from the at least one BWTD during the duration that violates the second limitations; and generate, based on the reconfigured rule, an alert for the identified characteristic data.

In another example, a method comprises receiving, from at least one body-worn tracking device (BWTD), characteristic data that indicates one or more characteristics of the at least one BWTD; determining a set of alert rules associated with at the least one BWTD, wherein the set of alert rules establish first limitations for characteristic data that cause a first alert to be generated when the characteristic data violates the first limitations; receiving a rule deviation request to deviate from at least one rule of the set of rules, wherein the rule deviation request specifies a duration for deviation from the at least one rule; determining, based on the rule deviation request, a reconfigured rule corresponding to the at least one rule, wherein the reconfigured rule establishes second limitations for the characteristic data that are different from the first limitations for the duration; identifying characteristic data that has been received from the at least one BWTD during the duration that violates the second limitations; and generating, based on the reconfigured rule, an alert for the identified characteristic data The details of one or more examples are set forth in the accompanying drawings and the description below. Other features, objects, and advantages of the disclosure will be apparent from the description and drawings, and from the claims.

DETAILED DESCRIPTION

Figure 1:
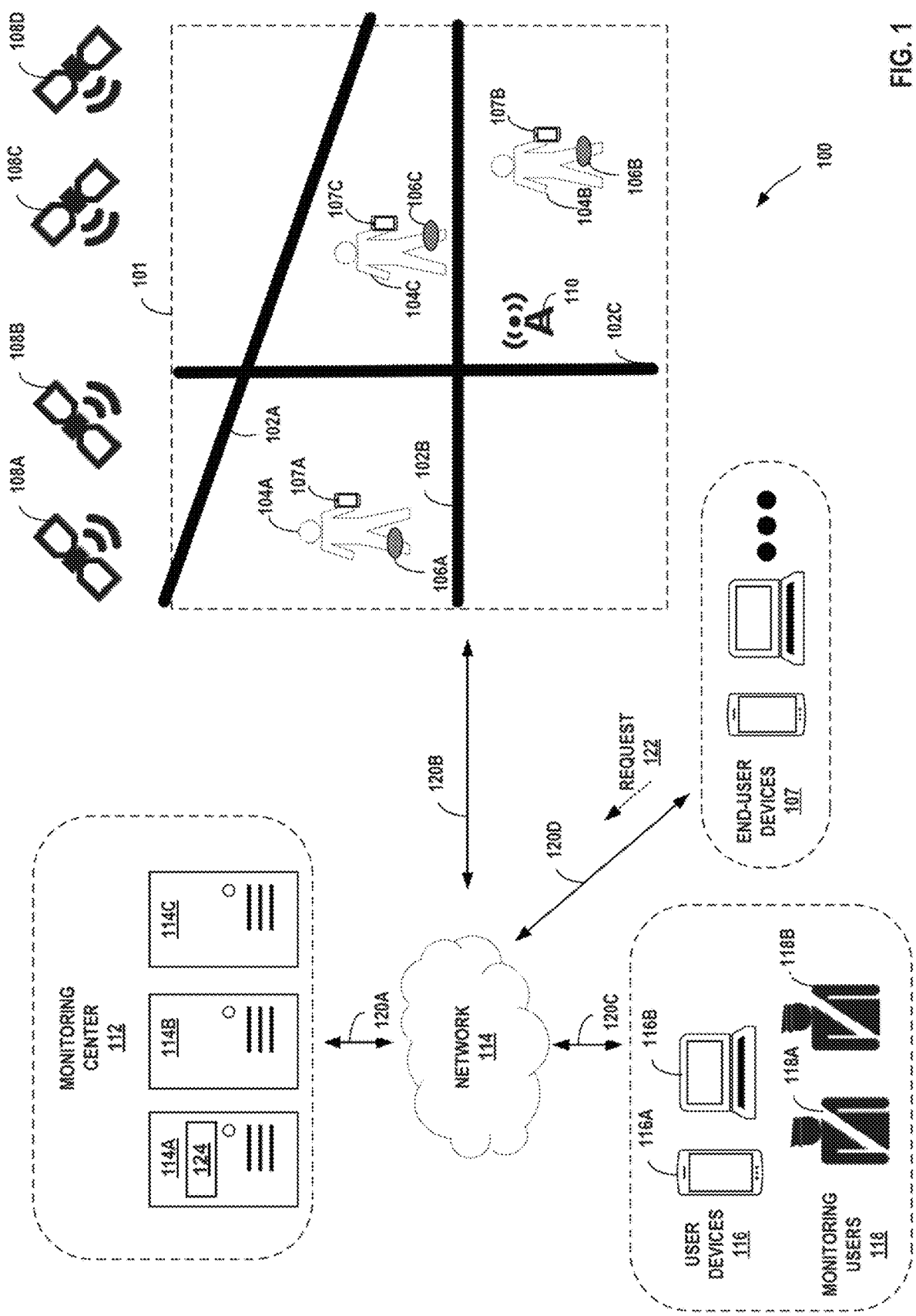
FIG. 1 illustrates an example system for determining one or more values that represent a monitoring attribute for one or more body-worn tracking devices, in accordance with techniques of this disclosure.

In an offender monitoring system, each offender may be assigned a device (e.g., a body-worn tracking device (BWTD)) that determines and stores a variety of data such as location, speed, heading, or the like at prescribed intervals (e.g., every minute). Each BWTD may have an associated set of configurable rules for the data that define prohibited activities or behaviors for a monitored person wearing the BWTD. The BWTD or a computing system of a supervising agency may generate an alert based on data from the BWTD that does not conform to the rules. A computing system of a supervising agency may typically be responsible for managing the rules, e.g., by receiving input from an administrator of the supervising agency (e.g., probation officers, parole officers, or other parties responsible for tracking BWTD data).

Development of BWTDs that collect data frequently for every monitored person may mean, in theory, that administrators have more time to spend on the more humane aspects like rehabilitation and treatment. However, increased monitoring may lead to increased infractions, even if infractions are relatively minor in nature. In some instances, administrators may spend an inordinate amount of time resolving relatively minor infractions. For example, a home curfew violation (e.g., data from a BWTD indicates that the monitored person is not at home at a particular time) may be a relatively minor infraction, but one that still requires an administrator officer to investigate, resolve and write-up. Even a relatively simple or minor infraction may take an administrator 30 minutes or longer to resolve. Hence, it may be relatively important that schedules for curfew and inclusion zones are accurate according to the home and working life schedule of the monitored person.

Caseloads for administrators may vary. If a caseload of an administrator includes 50 monitored persons, as an example, each monitored person is allocated approximately three hours per month. In the example above, an offender may request a change to a schedule due to changes in work or school hours, treatment programs, holidays, or the like. Processing change requests may involve manual manipulations of schedules by the administrator (e.g., logging in to an offender management system, verifying that there is no overlap inclusion zone schedules, verifying that the schedule change does not conflict with terms of monitoring, manually changing the schedule, and notifying the monitored person that the request has been processed), which may be relatively time intensive. Performing such time intensive tasks for each monitored person may not be feasible for an administrator.

The techniques of this disclosure are generally directed to computer-based system for managing data from BWTDs. For example, according to aspects of this disclosure, a computing system may receive a rule deviation for deviating from a rule associated with a BWTD for a prescribed duration. Based on the received request, the computing system may determine a reconfigured rule, also referred to herein as an exception, and generate alerts based on the reconfigured rule. As described herein, a reconfigured rule generally refers to a rule having different limitations than an initial rule upon which the reconfigured rule is based. That is, an initial rule may specify terms or limitations for compliance. The reconfigured rule may different terms for compliance with the initial rule.

According to aspects of this disclosure, the management system may generate an alert based on noncompliance with the reconfigured rule. In some instances, the computing system may be configured to suppress an alert that would have been generated based on an activity prohibited by initial rule but that is permitted by the reconfigured rule. The reconfigured rule may remain in effect for a duration specified by the request.

In an example, in operation, a monitored person may access a secured portal using a username and password combination. Once logged in, the monitored person may select a rule associated with the BWTD to which the monitored person is assigned. As one example, a rule may be associated with a daily or weekly schedule that defines times at which the monitored person is required to be inclusive or exclusive of a particular geographical region or zone. The monitored person may select, via a text-based or graphical user interface, a requested deviation to a particular day or for a particular week. In some instances, deviation requests may be limited to contractual rules associated with the supervising agency and corresponding administrative contract, such that the monitored person is not permitted to request a deviation that is outside the bounds of the administrative contract.

Upon completing a request, the request may be vetted by a management system for the BWTDs. A computing device of the management system may generate a deviation request for approval by the administrator assigned to the monitored person making the request. The request may include a description of the request as well as any other pertinent information for consideration by the administrator. The administrator may receive the request approve or deny the request. In some instances, the monitored person may receive a notification that indicates the approval or denial of a deviation request, which may include comments from the administrator.

Upon approval of the request, the management system may determine and enforce a reconfigured rule that is in effect for the duration specified by the request. For example, the management system may generate an alert based on noncompliance with the reconfigured rule. In some instances, the management system may suppress an alert that would have been generated based on an activity prohibited by initial rule but that is permitted by the reconfigured rule. In this way, the techniques may increase the efficiency with which rule deviation requests are processed and enforced.

FIG. 1 illustrates an example system 100 for determining one or more values that represent a monitoring attribute for one or more body-worn tracking devices, in accordance with techniques of this disclosure. FIG. 1 illustrates a geographic region 101, which may be a portion of the Earth's surface. Geographic region 101 includes multiple roads 102A-102C ("roads 102") on which monitored persons may travel. Geographic region 101 may include human (e.g., houses, buildings, and the like) and/or natural structures (trees, mountains, oceans, lakes, and the like). In some examples, geographic region 101 may be visually represented in a map, which may be two- or three-dimensional. Such maps may be output for display by computing devices as further described in this disclosure. In the example of FIG. 1, a map generated based on geographic region 101 may be visually similar in appearance to the representation of geographic region 101 as illustrated in FIG. 1.

System 100 may track the location of one or more monitored persons 104A-104C (collectively, monitored persons 104). A monitored person may be any person wearing a BWTD, such as BWTD's 106A-106C (collectively, BWTDs 106) which are respectively worn by monitored persons 104A-104C. In other examples, a "monitored person" may be interpreted as a non-human object to which a BWTD is attached. For instance, a monitored person may also be a vehicle, animal, or any other object that may or may not be move to different locations in a geographic area. In examples where a monitored person is non-human, the BWTD may be any device that is attached to, accompanies or is otherwise physically associated with the movable object, even if not necessarily bodily worn.

In the example of FIG. 1, monitored persons 104 may be released criminal offenders, although in other examples monitored persons may be any person. Released criminal offenders may include criminal offenders who have been suspected, accused, or convicted of a crime and released from a jail or prison. In such scenarios, system 100 may monitor the location of monitored persons 104. For instance, when monitored person 104A is released from jail or prison, a BWTD may be attached by law enforcement to the body of monitored person 104A. As further described in this disclosure, the BWTD may have a unique device identifier that is associated with personally identifying information of monitored person in a monitor center. In this way, as monitored person 104A moves to different locations in a geographic region, geographic location points generated by the BWTD and stored at the monitoring center may be associated with or otherwise attributed to monitored person 104A, such that the location and/or whereabouts of person 104A may be monitored.

In the example of FIG. 1, each of monitored persons 104A-104C are respectively wearing a BWTD 106A-106C. BWTD 106A-106C may have similar or the same functionality and construction. BWTD 106A may be a portable computing device that determines the location of a monitored person and reports such locations to a monitoring center or other physically separate computing device. BWTD may include a physical housing constructed of plastic or any other suitable material. The housing may include electronics such as, but not limited to: one or more computer processors, one or more memories, one or more wired and/or wireless communication devices (e.g., Global Positioning System (GPS) component, cellular or other network communication component, WiFi component, short-range (e.g., NFC, Bluetooth component, USB component), one or more output devices (e.g., haptic feedback component, lights, user interface display components, audio components), power sources (e.g., battery, power supply), and one or more printed circuit boards that physically, communicatively, and/or electronically couple such electronic devices to one another within the housing of the BWTD.

A BWTD may determine location information via GPS. While references are made herein to GPS, it should be understood that the techniques are equally applicable to any global navigation satellite system (GNSS). In some examples, a BWTD is a one-piece design in which GPS communication hardware and all other hardware for the BWTD are included in a single physical housing. In other examples, a BWTD may be a two-piece design. For example, in some instances, a BWTD may not include GPS communication hardware, which is physically separate from but in communication with the BWTD. For instance, the monitored person may carry a physical device with GPS communication hardware (e.g., such as a telephone having GPS functionality), and separately the BWTD may be attached to the monitored person and in communication with the GPS communication hardware. Further details of the components included within a BWTD are illustrated and described in FIG. 3.

In some examples, BWTD 106A may further include a combination of software components and hardware components to perform one or more monitoring functions. For instance. BWTD 106A may include tracking component comprised of hardware and/or software that communicates with the GPS hardware component to determine and record GPS coordinates of BWTD 106A. In some examples, the location components sends such GPS coordinates of BWTD 106A to a monitoring center or other physically separate computing device.

BWTD 106A may include and notification component comprised of hardware and/or software that compares GPS coordinates of BWTD 106A to a set of restricted locations and/or regions and generates notifications. A restricted region may be a region in which a monitored person may not enter and a restricted location may be a location from which the monitored person (and therefore BWTD) must be separated from by at least a defined or specified distance. Data stored on a BWTD that define restricted locations and/or regions may be provided by a monitoring center or any other computing device that is physically separate from BWTD 106A.

BWTD 106A may include a communication component comprised of hardware and/or software that sends and receives data through a network such as a Wi-Fi, ZigBee, Low Power Wide Area (LoRa), cellular, or other network. The communication component may initiate, manage, and terminate communication sessions between network infrastructure and BWTD 106A. Network infrastructure may provide a wireless network for data communication to and from BWTD 106A over a geographically distributed area. In some examples, network infrastructure may be owned and operated by a third-party, wireless or cellular carrier provider. Examples of such networks may include a set of one or more geographically dispersed towers with radios, antennas and/or other communications components that provide for data communication with BWTD 106A using one or more protocols such as 2G, 3G, 4G, Long-Term Evolution (LTE), LoRa or any other suitable protocol. As BWTD 106A moves into and out of proximity of different towers, BWTD 106A may initiate and terminate communication sessions between BWTD 106A and the various towers, where a tower may be a Base Station Transceiver in a wireless communication network, such as a cellular network.

In some examples, BWTD 106A may include configuration component comprised of hardware and/or software to manage BWTD 106A. The management module may write data to memory of BWTD 106A that is received from a monitoring center or other physically separate computing device. Data may include restricted regions and/or restricted locations, configuration data to configure one or more components of BWTD 106A, information that uniquely identifies BWTD 106A and/or monitored person 104A that is wearing BWTD 106A, or any other suitable information.

Components such as the location component, enforcement component, communication component, and management component may perform operations described herein using software, hardware, firmware, or a mixture of both hardware, software, and firmware residing in and executing on BWTD 106A or at one or more other remote computing devices. In some examples, BWTD 106A may execute its various components when embodied in software with one or more processors to perform the functionality described in this disclosure. BWTD 106A may execute any of such components as or within a virtual machine, userspace application, operating system or any other operating environment executing on underlying hardware.

Each of monitored persons 104 may also be associated with respective end-user computing devices 107A-107C (collectively, end-user computing devices 107). End-user computing devices 107 may be a computing device including, but not limited to a laptop computer, a tablet computer, a smartphone, a desktop computer, a server computer, a body worn computer (e.g., smartwatch, head-mounted device), or any other suitable computing device. In some examples, end-user computing devices 107 may form part of a two-piece BWTD.

End-user computing devices 107 may include one or more components comprised of a combination of hardware and software. For instance, as described in greater detail below, end-user computing devices 107 may execute a deviation request application implemented in software and executable on hardware of end-user computing devices 107. The deviation request application may provide a platform that allows monitored persons 104 to generate electronic requests to deviate from rules associated with BWTDs 106. In some examples, the deviation request application may natively implement functionality described in this disclosure, while in other examples the deviation request application may be a web-browser that accesses a web-based application with such functionality via a web-hosted application.

As shown in FIG. 1, system 100 may include one or more satellites 108A-108D ("satellites 108"). In some examples satellites 108 may comprise a set of global navigation satellites in a global navigation satellite system (GNSS). Satellites 108 continuously transmit their current time and position. As described above, BWTD 106A may include a GPS component that monitors multiple satellites to determine the position of BWTD 106A. Although only four satellites 108A-108D are shown, different numbers of satellites may be used by BWTD 106A to determine the GPS coordinates of BWTD 106A at a point in time.

System 100 may also include one or more towers, such as tower 110 that form network infrastructure. Tower 110 may include a physical structure that supports antennae, a GPS receiver, one or more sets of digital signal processors, transceivers, and control electronics, which collectively operate to establish sessions with end-user devices such as BWTDs, smartphones, or any other computing device. Tower 110, together with one or more other towers that include similar functionality, may be geographically dispersed, such as to provide a geographically dispersed wireless network for voice and/or data communication. Tower 110 and switching infrastructure (not shown) may be owned and operated by wireless carrier providers that charge customer/subscribers fees to operate on the wireless carrier provider.

Figure 2:
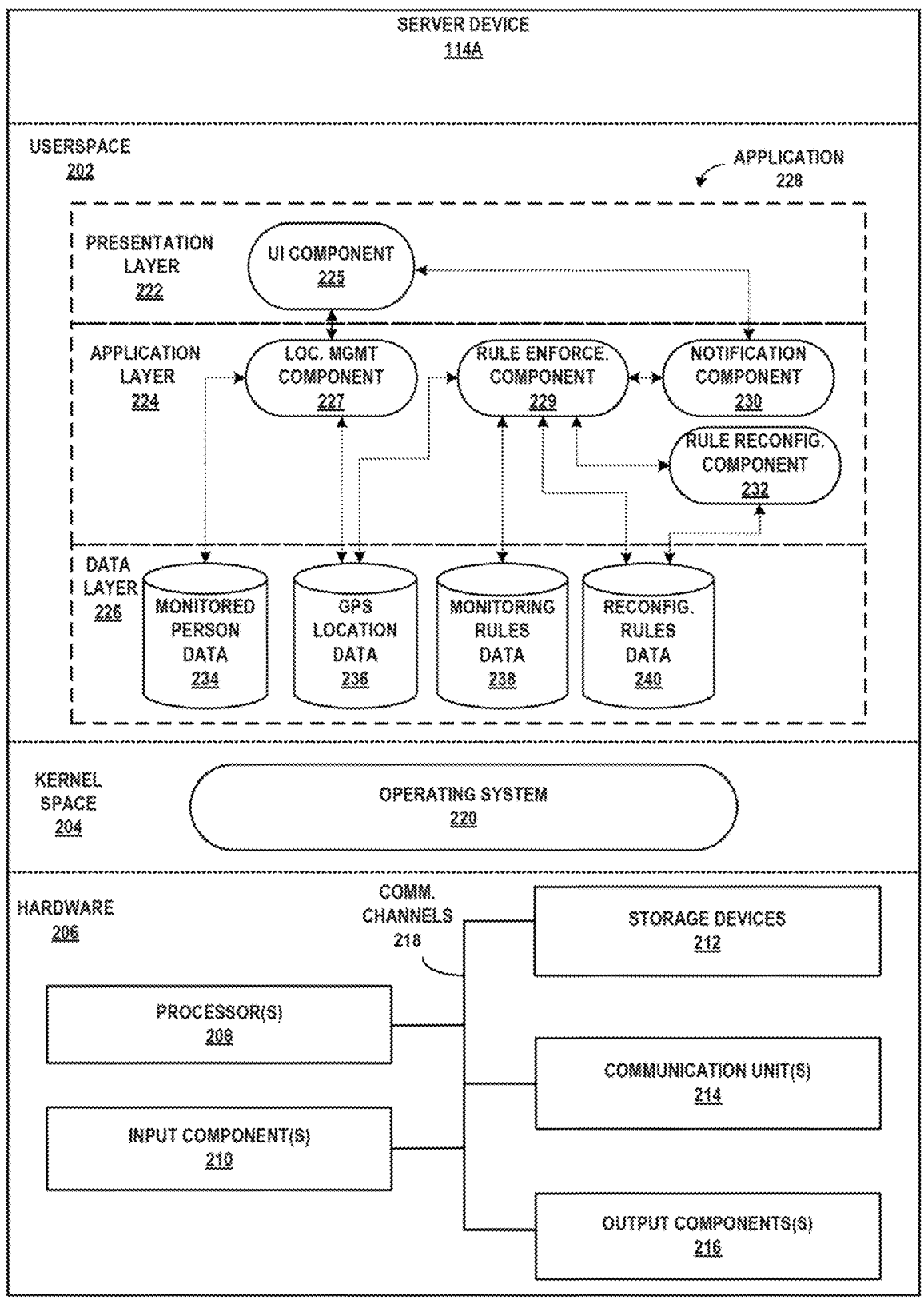
FIG. 2 is a block diagram illustrating an example computing device, in accordance with one or more aspects of the present disclosure.

FIG. 1 also includes monitoring center 112. Monitoring center 112 may be owned and operated by a private entity or a government entity. Monitoring center 112 may include one or more computing devices, such as server devices 114A-114C ("server devices 114"). Further details of the components included within server devices 114 is illustrated in FIG. 2. Server devices 114 may collectively provide a data center to monitor and track monitored persons based on, among other data, GPS coordinates of BWTDs that are provided to servers 112.

In some examples, server devices 114 may store an association between a monitored person and a respective BWTD worn by the monitored person. For instance, at the time that a law enforcement officer attaches a BWTD to the monitored person, the law enforcement officer may, using a separate, end-user computing device in communication with monitoring center 112, provide user input that creates an association between a unique identifier of the monitored person and a unique identifier of the BWTD. For instance, the association may be stored as a record in a database. As GPS coordinates are received by monitoring center 112 from the BWTD with the unique identifier of the BWTD, monitoring center 112 may store such GPS coordinates in association with the unique identifier of the BWTD. In this way, an operator of monitoring center 112 may determine the GPS coordinates associated with a particular monitored person.

Monitoring center 112 may receive configuration input from users, such as law enforcement officers, that define restricted locations and restricted regions. Such configuration input may be sent by a computing device of the user to monitoring center 112 via network 115. The configuration input may specify a unique identifier of the monitored person and/or BWTD and may also include properties such as named locations, perimeters, GPS coordinates or any other properties that may be used to define a restricted location and/or restricted region. By associating restricted locations and/or regions with a BWTD and/or monitored person wearing the BWTD, monitoring center 112 can determine violations, such as, determining whether a monitored person is operating within a restricted region and/or within a prohibited distance of a restricted location (e.g., a violation).

In some examples, monitoring center 112 determines that a monitored person is in violation of a restricted location or region, monitoring center may send one or more notifications. In some examples, monitoring center 112 may send a notification via network 115 to the BWTD for the violation, which may cause the BWTD to output an alert (e.g., haptic, visual, and/or audio feedback). In some examples, monitoring center 112, in response to detecting a violation, may send notifications to one or more other users, who may be associated with the monitored person who is in violation. For instance, to determine the one or more other users associated with the monitored person, monitoring center 112 may store within a record of a database a unique identifier of a law enforcement officer in association with a unique identifier of a monitored person.

Monitoring center 112 may generate user interfaces for display, such as maps that indicate different locations at which a monitored offender has been physically present. In some examples, monitoring center 112 may illustrate different locations at which a monitored offender has been physically present over a period of time. Monitoring center 112 may output any data that is stored in any suitable format including still and moving image data, audio data, and the like.

System 100 also includes user devices 116A-116B ("user devices 116") and monitoring users 118A-118B ("monitoring users 118") who use user devices 116. User devices 116 may be a computing device including, but not limited to a laptop computer, a tablet computer, a smartphone, a desktop computer, a server computer, a body worn computer (e.g., smartwatch, head-mounted device), or any other suitable computing device. User devices 116A and 116B may have similar or the same components and functionality, in some examples.

User device 116A may include one or more components comprised of a combination of hardware and software. For instance, user device 116A may execute a monitoring application implemented in software and executable on hardware of user device 116A. The monitoring application may provide notifications of violations, maps or other visual representations of monitored offender locations based on real-time or past-generated GPS coordinates. The monitoring application may also generate and send that associates a unique identifier of a BWTD with a unique identifier of a monitored person. In some examples, the monitoring application may natively implement functionality described in this disclosure, while in other examples the monitoring application may be a web-browser that accesses a web-based application with such functionality via a web-hosted application executing at monitoring center 112.

Monitoring users 118 may include law enforcement, parole officers, or any other public safety officials or employees. In some examples, monitoring users 118 may also include non-public safety offices/employees, such as past or potential victims of a monitored offender, school administrators, or any other potential user that may be interested in or need to know of the location or violations of a monitored offender. Monitoring users 118 may receive notifications by using user devices 116, which are sent by monitoring center 112.

Network 115 may represent a publicly accessible computer network that is owned and operated by a service provider, which is usually large telecommunications entity or corporation. Although not illustrated, service provider network 115 may be coupled to one or more networks administered by other providers, and may thus form part of a large-scale public network infrastructure, e.g., the Internet. Network 115 may provide computing devices such as BWTD, user devices, and monitoring center 112 with access to the Internet, and may allow the computing devices to communicate with each other. In some examples, network 115 may include one or more local area networks (LANs), such as user device devices 116 may communicate with monitoring center 112 through the Internet and/or a LAN on which both monitoring center 112 and user devices 116 are included.

Although additional network devices are not shown for ease of explanation, it should be understood that network 115 and system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. It should be understood that one or more additional network elements may be included along any of network links 120A-120D, such that the devices of system 110 are not directly coupled. Network links 120A-120D may be wired or wireless communication links, such as 100 Mbps, 1 Gbps, or 10 Gbps WiFi connections and/or physical cable connections, to name only a few examples.

In operation, in order to monitor a released criminal offender, such as monitored person 104A, a law enforcement officer, such as monitoring user 118A, may attach BWTD 106A to the ankle of monitored person 104A. In some examples, BWTD 106A may include a tamper-resistant strap that binds BWTD 106A to monitored person 104A. BWTD 106A may include one or more components comprised of hardware and/or software that detect if either the tamper-resistant strap and/or the housing/internal components of BWTD 106A have been tampered with by a monitored offender or other person. If BWTD 106A detects that tampering is or has occurred, then BWTD 106A may send a message via network 115 to monitoring center 112 to indicate the tampering event.

Upon attaching BWTD 106A to the ankle of monitored person 104A, monitoring user 118A may provide one or more user inputs to user device 116B that define an association between BWTD 106A and monitored person 104 in monitoring center 112. User device 116B, for example, may output for display a graphical user interface. The graphical user interface may include one or more user interface components, such as input fields, dropdown menus, labels or text fields, or any other graphical component through which a user may interact with user device 116B.

In the example of FIG. 1, monitoring user 118A may provide one or more inputs that specify or select a unique identifier of BWTD 106A and may further provide one or more user inputs that specify or select a unique identifier of monitored person 104A. Upon specifying or selecting the unique identifiers of BWTD 106A and/or monitored person 104A, monitoring user 118A may provide one or more user inputs to define an association between the respective unique identifiers. User device 116A may send one or more messages to monitoring center 112 that define in data, the association between the unique identifier of monitored person 104A and BWTD 106A.

In some examples, monitoring user 118A may specify other data in monitoring center 112 that is associated with BWTD 106A and/or monitored person 104A. Such data may include rules for data from BWTD 106A that define prohibited activities or behaviors for a monitored person 106A. Monitoring center 112 (or BWTD 106A) may generate an alert based on data from BWTD 106A that does not conform to the rules.

For instance, monitoring user 118A may provide one or more user inputs at user device 116A that specify restricted locations and/or restricted regions. Monitoring user 118A may provide one or more user inputs at user device 116A that specify permissible times or distances that a monitored person is allowed to travel or otherwise move about. Monitoring user 118A may provide one or more user inputs at user device 116A that specify one or more permissible locations and/or permissible regions. A permissible region may be a bounded region in which a monitored person must remain within and a permissible location may be a location from which the monitored person (and therefore BWTD) must be within at least a defined or specified distance. User device 116A may send one or more messages to monitoring center 112 with the data specified by monitoring user 118A, and monitoring center 112 may configure or associate the data with the unique identifier of monitored person 104A and BWTD 106A.

Upon monitoring user 118A attaching to and configuring BWTD 106A with monitored person 104A, monitored person 104A may be released from custody into the general public (i.e., released from a confined or restricted condition, such as a jail, prison, or courthouse). As monitored person 104A moves throughout a geographic region, such as geographic region 101, BWTD 106A determines respective GPS locations of BWTD 106A and sends messages to monitoring center 112 that include at least a unique identifier of BWTD 106A and/or monitored person 104A, unique tower identifier, GPS coordinates (latitude, longitude), and timestamps for when each respective GPS coordinate has been determined. BWTD 106A may send such messages through wireless communication with tower 110, which in turns sends the messages to monitoring center 112 via network 115, and in some examples one or more additional, intermediate networked devices (not shown in FIG. 1).

In this way, monitoring center 112, determines and stores the locations of monitored person 104A over time. Monitoring center 112 may determine whether monitored person 104A is in violation of a restricted location/region, a permissible location/region, a time period for permitted travel with respect to a restricted/permissible location/region, or any other property, rule, condition, or otherwise defined within or specified at monitoring center 112. As noted above, one of server devices 114 may issue a notification or alert based on the occurrence of an event, such as upon determining that monitored person 104A has traveled to a restricted region (e.g., as indicated by location data from BWTD 106A).

According to aspects of this disclosure, monitored persons 104 may request, via end-user devices 107, one or more requests for deviations 122 from rules defined within or specified at monitoring center 112. For example, as described herein, a rule generally refers to any prescribed guide for conduct or action that is based on data from BWTDs 106. As examples, rules may define permitted or prohibited geographical regions, time periods, proximities to locations or persons of interest, or the like. Rules may additionally or alternatively define permitted or prohibited operating conditions of BWTDs 106 (e.g., a battery status of BWTDs 106, a wireless, cellular or satellite signal status of BWTDs 106, a condition of a restraint of BWTDs 106, or the like).

Hence, rules may establish limitations for data from BWTDs 106, such that monitoring center 112 (and/or BWTDs 106) generate alerts (also referred to herein as notifications) based on data that violates the limitations. The data from BWTDs 106 upon which rules are based may be referred to herein as characteristic data. Characteristic data may include any data from BWTDs 106 that indicates a trait, quality, or property of BWTDs 106 and/or monitored persons 104. For example, BWTDs 106 may generate characteristic data that indicates a unique identifier of BWTDs 106 and/or monitored persons 104, a geo-location of BWTDs 106 (e.g., GPS coordinates), a time at which location data is gathered (e.g., timestamp data), a receive signal strength of one or more navigational satellites (e.g., GPS receive signal strength), a signal strength of a communication tower, a directional heading, a speed, whether BWTDs 106 are at rest, an ambient temperature in which BWTDs 106 are located, whether BWTDs 106 are in motion without a GPS signal, whether a housing or tamper-resistant strap of BWTDs 106 has been tampered with, or the like. It should be understood that the examples noted above is not an exhaustive list, and BWTDs 106 may generate other data that indicates a variety of other characteristics of BWTDs 106 and/or monitored persons 104.

According to aspects of this disclosure, based on requests 122, monitoring center 112 may determine one or more reconfigured rules 124, also referred to herein as exceptions. As described herein, a reconfigured rule 124 generally corresponds to an already established rule at monitoring center 112 and establishes a second set of limitations for the characteristic data upon which the already established rule is based. In an example for purposes of illustration, a rule may establish a prohibited geographical region, such that monitoring center 112 and/or BWTD 106A generates an alarm based on data that indicates that BWTD 106A is located in the prohibited geographical region. According to aspects of this disclosure, reconfigured rule 124 may define an expanded or different geographical region, such that monitoring center 112 and/or BWTD 106A generates an alarm based on data that indicates that BWTD 106A is located in the expanded or different geographical region.

Monitoring center 112 and/or BWTDs 106 may issue or suppress alerts based on reconfigured rules 124. For example, after determining reconfigured rule 124, monitoring center 112 may receive characteristic data from BWTDs 106 that violates an initial rule upon which reconfigured rule 124 is based, e.g., that is outside of the limitations defined by the initial rule. However, monitoring center 112 may generate an alert based on characteristic data that violates reconfigured rule 124. In some instances, based on reconfigured rule 124, monitoring center 112 may suppress (e.g., not generate) an alert that would have been generated based on the initial rule.

In some instances, reconfigured rules 124 may be in effect for a prescribed duration, which may be specified by request 122. For example, according to aspects of this disclosure, request 122 may specify a duration for deviation from the rule corresponding to reconfigured rule 124. After the duration, monitoring center 112 may automatically revert back to the rule upon which reconfigured rule 124 is based. For example, monitoring center 112 may no longer enforce reconfigured rule 124 and may instead issue alerts based on the rule upon which reconfigured rule 124 is based. In some examples, monitoring center 112 clear reconfigured rule 124 from server devices 114 or mark reconfigured rule 124 as inactive.

In operation, as an example for purposes of illustration, monitored person 104A may wish to deviate from a rule established for BWTD 106A. Using end-user computing device 107A, monitored person 104A may generate request 122 for deviation from the established rule. Request 122 may include a variety of information including, as examples, data that identifies monitored person 104A and/or BWTD 106A, data that indicates a monitoring user 118 associated with monitored person 104A, data that indicates the rule being deviated from, data that indicates a requested duration of the deviation, a description of a reason for deviation, or the like.

In some examples, monitored person 104A may generate request 122 by inputting the data via a graphical user interface (GUI). For example, end-user computing device 107 may include a native deviation request application that generates a request GUI. As another example, such a deviation request application may be a web-browser that accesses a web-based application with such functionality via a web-hosted application executing at monitoring center 112. An example of a GUI for generating request 122 is described with respect to FIG. 4 below.

Monitoring center 112 may receive request 122 via network 114. In some instances, monitoring center 112 may generate a notification that corresponds to request 122 and send the request to user device 116A of monitoring user 118A, thereby notifying monitoring user 118A that monitored person 106A has requested a deviation from a rule. Monitoring center 112 may additionally or alternatively add request 122 to a queue of deviation requests for monitoring user 118A that includes all deviation requests that have been requested by monitored persons 106 being monitored by monitoring user 118A. Monitoring user 118A may access the queue via an interface generated at user device 116A.

Monitoring user 118A may approve or deny request 122. Upon approving request 122, monitoring center 112 generates reconfigured rule 124. Monitoring center 112 may enforce reconfigured rule 124. That is, monitoring center 112 may generate alerts based on data that violates reconfigured rule 124. Likewise, in some instances, monitoring center 112 may suppress alerts for activity that would have prompted an alert under the initial rule but that is permitted under reconfigured rule 124.

According to aspects of this disclosure, monitoring center 112 and/or BWTDs 106 may determine reconfigured rules 124 for a variety of different characteristic data from BWTDs 106. As one example, characteristic data may include location data (e.g., GPS coordinates). In this example, monitoring center 112 and/or BWTDs 106 may maintain an initial rule that includes geographic limitations, such that monitoring center 112 and/or BWTDs 106 generates an alert when location data from BWTDs 106 indicates that BWTDs 106 are outside of a predetermined geographical area or proximate to a geographical location of interest (e.g., a particular building, property, or the like). Monitoring center 112 and/or BWTDs 106 may determine reconfigured rule 124 that establishes second geographic limitations that include a second predetermined geographical area or a second geographical location of interest. Monitoring center 112 and/or BWTDs 106 may suppress or generate alerts based on reconfigured rule 124.

As another example, characteristic data may include temporal data and location data (e.g., GPS coordinates). In this example, monitoring center 112 and/or BWTDs 106 may maintain an initial rule that includes temporal and geographic limitations, such that monitoring center 112 and/or BWTDs 106 generates an alert when location data from BWTDs 106 indicates that BWTDs 106 are outside of a predetermined geographical area or proximate to a geographical location of interest (e.g., a particular building, property, or the like) at a predetermined time. Monitoring center 112 and/or BWTDs 106 may determine reconfigured rule 124 that establishes second geographic limitations or second times. Monitoring center 112 and/or BWTDs 106 may suppress or generate alerts based on reconfigured rule 124.

To illustrate, using the geographical and temporal limitations from the example above, monitoring center 112 and/or BWTD 106s may enforce a rule that requires monitored person 104A to be located at a work location (geographical limitation) between the hours of 9 AM and 5 PM (temporal limitation). Based on a change to the work schedule of monitored person 104A, monitored person 104A may generate request 122 that specifies a deviation from the rule that allows monitored person 104A to be at the work location between the hours of 7 AM and 3 PM. In some instances, request 122 may specify a duration for deviation, such as one day, one week, one month, or the like. Upon approval of request 122 by one of monitoring users 118, monitoring center 112 may generate a reconfigured rule that requires monitored person 104A to be at the work location between the hours of 7 AM and 3 PM. For the specified duration, monitoring center 112 may suppress, as an example, an alert based on based on data that indicates that monitored person 104A is not at the work location at 4 PM (which would not have been permitted under the initial rule). Monitoring center 112 may generate, as another example, an alert based on based on data that indicates that monitored person 104A is not at the work location at 8 AM (which would not have been required under the initial rule).

As still another example, characteristic data may include communication status data. The communication status data may indicate a communication status between a first component of one of BWTDs 106 to a second component (e.g., for a two component BWTD 106). In this example, monitoring center 112 and/or BWTDs 106 may maintain an initial rule that includes communication status limitations, such that monitoring center 112 and/or BWTDs 106 generates an alert when the communication status data indicates that the first component is not in communication with the second component. Monitoring center 112 and/or BWTDs 106 may determine reconfigured rule 124 that establishes communication status limitations that permit a break in communication between the first component and the second component. Monitoring center 112 and/or BWTDs 106 may suppress or generate alerts based on reconfigured rule 124.

As still another example, characteristic data may include battery status data. The battery status data may indicate a battery charge status, e.g., a quantity of remaining charge of a battery of one of BWTDs 106. In this example, monitoring center 112 and/or BWTDs 106 may maintain an initial rule that includes battery status limitations, such that monitoring center 112 and/or BWTDs 106 generates an alert when the battery status data indicates that the battery charge status of the battery is lower than a threshold amount. Monitoring center 112 and/or BWTDs 106 may determine reconfigured rule 124 that establishes second battery status limitations that permit a battery charge status that is lower than the threshold amount. Monitoring center 112 and/or BWTDs 106 may suppress or generate alerts based on reconfigured rule 124.

As still another example, characteristic data may include communication link data, e.g., between BWTDs 106 and monitoring center 112. The communication link data may indicate whether one of BWTDs 106 has an established communication link to a communication network, such as a cellular or other communication network. In this example, monitoring center 112 and/or BWTDs 106 may maintain an initial rule that includes communication link limitations, such that monitoring center 112 and/or BWTDs 106 generates an alert when the communication link data indicates that BWTD 106 is not connected to the communication network. Monitoring center 112 and/or BWTDs 106 may determine reconfigured rule 124 that establishes second communication link limitations that permit BWTD 106 to be without a communication link. Monitoring center 112 and/or BWTDs 106 may suppress or generate alerts based on reconfigured rule 124.

It should be understood that the examples provided above are intended to be examples, and that other rules and deviations from such rules are also possible.

FIG. 2 is a block diagram illustrating an example computing device, in accordance with one or more aspects of the present disclosure. FIG. 2 illustrates only one particular example of server device 114A in monitoring center 112, as shown in FIG. 1. Many other examples of server device 114A may be used in other instances and may include a subset of the components included in example server device 114A or may include additional components not shown example server device 114A in FIG. 2. In some examples, server device 114A may be a server, tablet computing device, smartphone, wrist- or head-worn computing device, laptop, desktop computing device, or any other computing device that may run a set, subset, or superset of functionality included in application 228.

As shown in the example of FIG. 2, server device 114A may be logically divided into user space 202, kernel space 204, and hardware 206. Hardware 206 may include one or more hardware components that provide an operating environment for components executing in user space 202 and kernel space 204. User space 202 and kernel space 204 may represent different sections or segmentations of memory, where kernel space 204 provides higher privileges to processes and threads than user space 202. For instance, kernel space 204 may include operating system 220, which operates with higher privileges than components executing in user space 202.

As shown in FIG. 2, hardware 206 includes one or more processors 208, input components 210, storage devices 212, communication units 214, and output components 216. Processors 208, input components 210, storage devices 212, communication units 214, and output components 216 may each be interconnected by one or more communication channels 218. Communication channels 218 may interconnect each of the components 208, 210, 212, 214, and 216 for inter-component communications (physically, communicatively, and/or operatively). In some examples, communication channels 218 may include a hardware bus, a network connection, one or more inter-process communication data structures, or any other components for communicating data between hardware and/or software.

One or more processors 208 may implement functionality and/or execute instructions within server device 114A. For example, processors 208 on server device 114A may receive and execute instructions stored by storage devices 212 that provide the functionality of components included in kernel space 204 and user space 202. These instructions executed by processors 208 may cause server device 114A to store and/or modify information, within storage devices 212 during program execution. Processors 208 may execute instructions of components in kernel space 204 and user space 202 to perform one or more operations in accordance with techniques of this disclosure. That is, components included in user space 202 and kernel space 204 may be operable by processors 208 to perform various functions described herein.

One or more input components 210 of server device 114A may receive input. Examples of input are tactile, audio, kinetic, and optical input, to name only a few examples. Input components 210 of server device 114A, in one example, include a mouse, keyboard, voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more output components 216 of server device 114A may generate output. Examples of output are tactile, audio, and video output. Output components 216 of server device 114A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

Output components 216 may be integrated with server device 114A in some examples. In other examples, output components 216 may be physically external to and separate from server device 114A, but may be operably coupled to server device 114A via wired or wireless communication. An output component may be a built-in component of server device 114A located within and physically connected to the external packaging of server device 114A (e.g., a screen on a mobile phone). In another example, presence-sensitive display 202 may be an external component of server device 114A located outside and physically separated from the packaging of server device 114A (e.g., a monitor, a projector, etc. that shares a wired and/or wireless data path with a tablet computer). Output components 216 may provide haptic, vibratory or other tactile output.

One or more communication units 214 of server device 114A may communicate with external devices by transmitting and/or receiving data. For example, server device 114A may use communication units 214 to transmit and/or receive radio signals on a radio network such as a cellular or other wireless radio network. In some examples, communication units 214 may transmit and/or receive satellite signals on a satellite network such as a Global Positioning System (GPS) network. Examples of communication units 214 include a network interface card (e.g. such as an Ethernet card), an optical transceiver, a radio frequency transceiver, a GPS receiver, or any other type of device that can send and/or receive information. Other examples of communication units 214 may include Bluetooth®, GPS, 3G, 4G, and Wi-Fi® radios found in mobile devices as well as Universal Serial Bus (USB) controllers and the like.

One or more storage devices 212 within server device 114A may store information for processing during operation of server device 114A. In some examples, storage device 212 is a temporary memory, meaning that a primary purpose of storage device 212 is not long-term storage. Storage devices 212 on server device 114A may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 212, in some examples, also include one or more computer-readable storage media. Storage devices 212 may be configured to store larger amounts of information than volatile memory. Storage devices 212 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 212 may store program instructions and/or data associated with components included in user space 202 and/or kernel space 204.

As shown in FIG. 2, application 228 executes in userspace 202 of server device 114A. Application 228 may be logically divided into presentation layer 222, application layer 224, and data layer 226. Presentation layer 222 may include user interface (UI) component 124, which generates and renders user interfaces of application 228. Application layer 224 may include location management component (LMC) 227, rule enforcement component (REC) 229, notification component 230, and rule reconfiguration component (RRC) 232. Presentation layer 222 may include UI component 225.

Data layer 226 may include one or more datastores. A datastore may store data in structure or unstructured form. Example datastores may be any one or more of a relational database management system, online analytical processing database, table, or any other suitable structure for storing data. Monitored person data 234 may include information descriptive of monitored persons and/or monitoring users. Example data, may include unique identifier for monitored person or user, name, address, phone number, notes, or any other descriptive information of a monitored person or monitored person, such as a type of offense, a degree of offense (e.g., a legal degree of offense, such as second degree battery), or the like.

GPS location data 236 may include GPS locations of BWTDs and other data associated with the GPS locations. For instance, a record or other instance of GPS location data may include, but is not limited to, any one or more of: unique identifier of BWTD and/or monitored person wearing BWTD, timestamp, GPS coordinates (latitude, longitude), a receive signal strength of one or more navigational satellites (e.g., GPS receive signal strength), signal strength of communication tower, and directional heading of BWTD, speed at which a BWTD is traveling, whether a BWTD is at rest, an ambient temperature in which a BWTD is located, whether a BWTD is in motion without a GPS signal, or the like. The data included in a record or other instance of GPS location data in GPS location data 236 may be a tuple or set of data sent by a BWTD to monitoring center 112, as described in FIG. 1.

Data layer 226 also includes monitoring rules data 238. Monitoring rules data 238 may include data that defines, one or more of: a restricted location/region, a permissible location/region, a time period for permitted travel with respect to a restricted/permissible location/region, permissible/restricted users who can or cannot be within a threshold distance of the monitored person, or any other property, rule, condition, to name only a few examples. In some instances, the monitoring rules defined by monitoring rules data 238 may be established based on conditions of release or parole of a monitored person. However, the monitoring rules need not be court mandated.

Data layer 226 also includes reconfigured rules data 240. According to aspects of this disclosure, reconfigured rules data 240 comprises reconfigured rules generated in response to a request for a deviation from one or more rules of monitoring rules data 238. For example, reconfigured rules data 240 may include one or more reconfigured rules that correspond to one or more respective rules of monitoring rules data 238. Hence, reconfigured rules data 240 may include data that defines, one or more of: a restricted location/region, a permissible location/region, a time period for permitted travel with respect to a restricted/permissible location/region, permissible/restricted users who can or cannot be within a threshold distance of the monitored person, or any other property, rule, condition, to name only a few examples. The reconfigured rules of reconfigured rules data 240 may establish different limitations for characteristic data from the respective rules to which the reconfigured rules correspond.

In some examples, according to aspects of this disclosure, reconfigured rules data 240 may include timing data. For example, as described herein, reconfigured rules may be associated with a particular duration, e.g., as specified in a request for deviation. In this example, reconfigured rules data 240 may include data that represents the duration. Reconfigured rules of reconfigured rules data 240 may remain in effect for the specified duration.

In operation, BWTD 106A may be attached and assigned to monitored person 104A. LMC 227 may receive a unique identifier of BWTD 106A and/or a unique identifier of monitored person 104A. LMC 227 may store data defining an association between the unique identifier of BWTD 106A and the unique identifier of monitored person 104A. As monitored person 104A moves within one or more different geographic regions, LMC 227 may receive location data from BWTD 106A including, but not limited to: a unique identifier of BWTD 106A and/or monitored person wearing BWTD 106A, GPS coordinates (latitude, longitude), a timestamp when the GPS coordinates (latitude, longitude) were determined, GPS receive signal strength when the GPS coordinates (latitude, longitude) were determined, signal strength of a tower when the GPS coordinates (latitude, longitude) were determined, and/or a directional heading of BWTD 106A when the GPS coordinates (latitude, longitude) were determined. LMC 227 may store such location data within GPS location data 236.

According to aspects of this disclosure, rule reconfiguration component 232 is configured to determine a reconfigured rule in response to a request for deviation from the rule and store the reconfigured rule to reconfigured rules data 240. For example, according to aspects of this disclosure, server device 114A may receive, via communication units 214, a request to deviate from one or more rules stored as monitoring rules data 238. In some instances, the rule deviation request may specify a duration for deviation from the one or more rules. Rule reconfiguration component 232 may determine, based on the rule deviation request, a reconfigured rule corresponding to the rule and store the reconfigured rule as reconfigured rules data 240. The reconfigured rules of reconfigured rules data 240 may establish different limitations for characteristic data from the respective rules to which the reconfigured rules correspond.

REC 229 may determine whether any other property, rule, condition of monitoring rules data 238 is satisfied, which may include data that defines, one or more of: a restricted location/region, a permissible location/region, a time period for permitted travel with respect to a restricted/permissible location/region, permissible/restricted users who can or cannot be within a threshold distance of the monitored person, or any other property, rule, condition. For instance, REC 229 may determine whether any other property, rule, condition is satisfied based on receiving one or more of GPS locations from LMC 227, GPS location data 236, and monitoring rules data 238. REC 229 may cause notification component 230 to send a notification to user devices of one or more monitoring users, and the notification may indicate a violation.

According to aspects of this disclosure, REC 229 may further determine whether any other property, rule, condition of reconfigured rules data 240 is satisfied. For example, in instances in which rule reconfiguration component 232 generates and stores a reconfigured rule as reconfigured rules data 240, REC 229 may enforce the reconfigured rule rather than the initial rule (of monitoring rules data 238) to which the reconfigured rule corresponds. In this way, REC 229 may enforce reconfigured rules while suppressing alerts (not generating alerts) that would have been generated based on monitoring rules data 238. REC 229 may continue to determine whether any other property, rule, condition of reconfigured rules data 240 is satisfied for a duration specified by reconfigured rules data 240.

Notification component 230 may receive data from REC 229 and send notifications (or messages) to computing devices external to server device 114A that cause such computing devices to output alerts, which may be visual, audio, haptic or any other type of discernable feedback. In this way, violations, statuses, or any other information may be communicated to devices of monitored persons and monitoring users. In some examples, events that cause notifications or messages to be sent by notification component 230 may also be logged by LMC 227, REC 229, and/or notification component 230 in monitored person data 234.

In some examples, UI component 225 may act as an intermediary between various components and modules of server device 114A to process and send input detected by input devices to other components and modules, and generate output from other components and modules that may be presented at one or more output devices. For instance, UI component 225 may generate one or more user interfaces for display, which may include data and/or graphical representations of maps, alerts, reports, or other communications as described in this disclosure.

Figure 4:
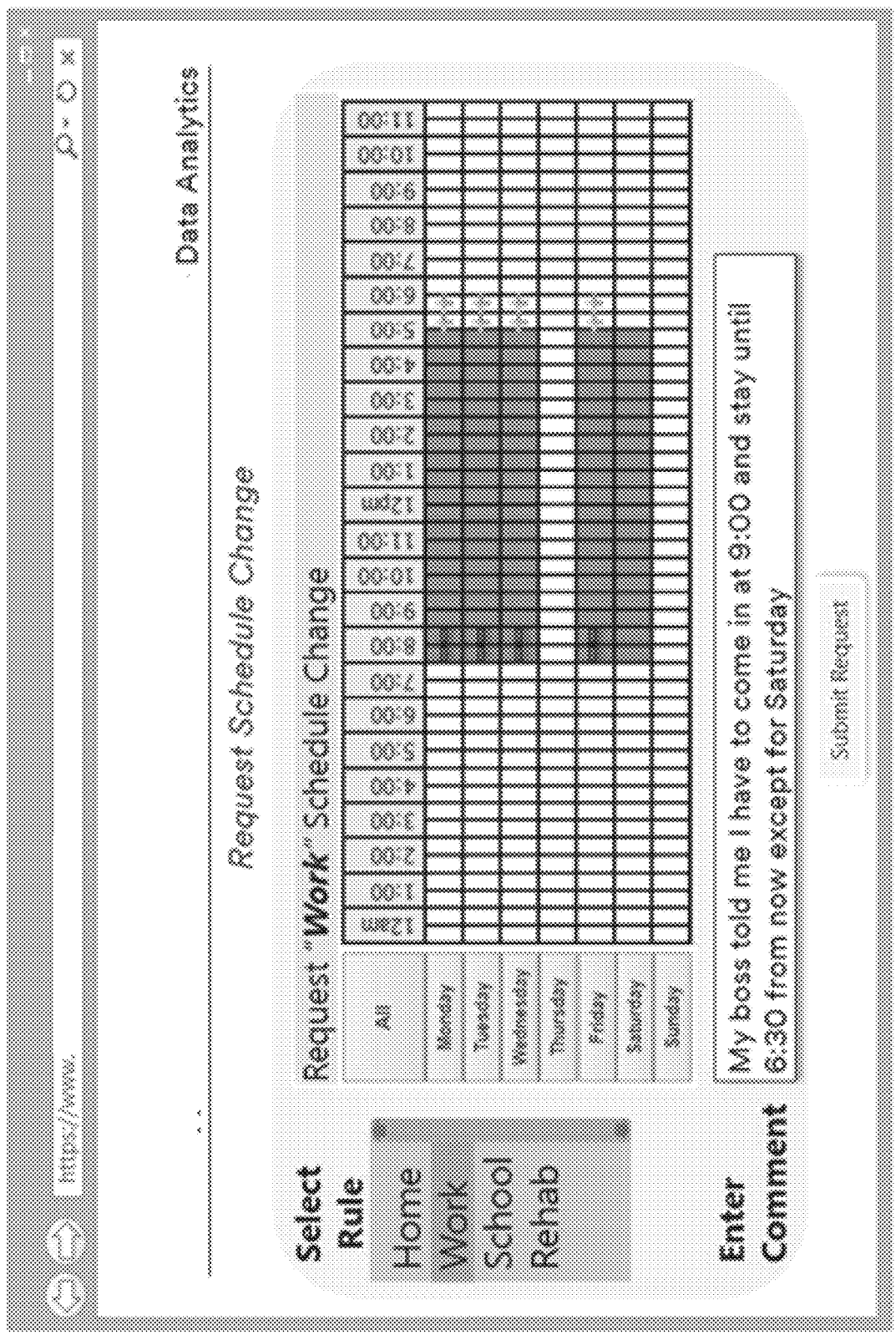
FIG. 4 is an illustration of a graphical user interface generated for display by a computing device, in accordance with techniques of this disclosure.

According to aspects of this disclosure, UI component 225 may generate one or more graphical user interfaces (GUIs) for generating requests for deviations and managing such requests. For example, monitoring center 114A may host a web-based application for execution by end-user devices in which UI component 225 generates a GUI for requesting deviations from one or more rules. FIG. 4 illustrates an example of such a GUI for requesting deviations.

Figure 5:
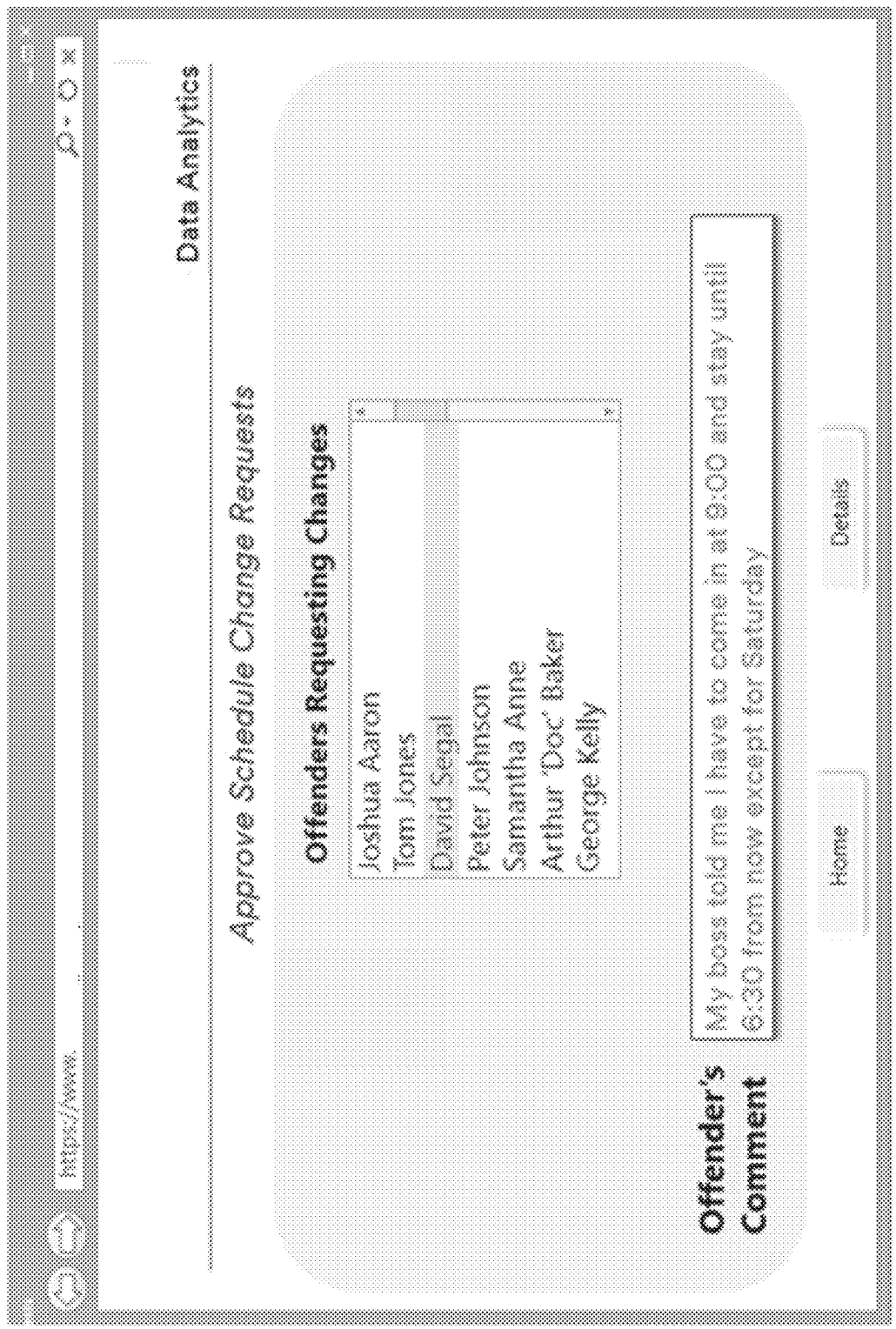
FIG. 5 is an illustration of another graphical user interface generated for display by a computing device, in accordance with techniques of this disclosure.
Figure 6:
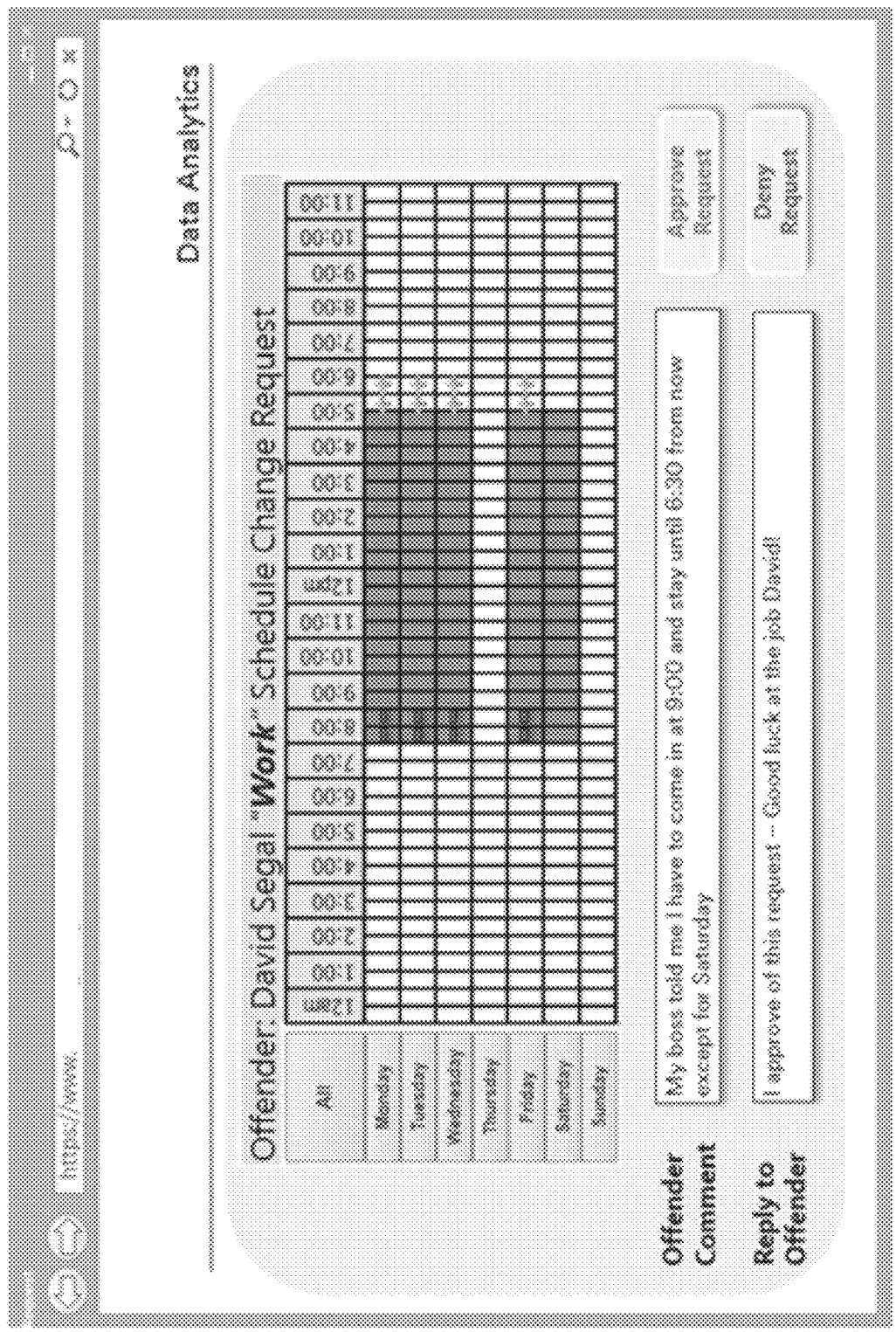
FIG. 6 is an illustration of another graphical user interface generated for display by a computing device, in accordance with techniques of this disclosure.

In other examples, UI component 225 may generate one or more GUIs for managing rule deviation requests. For example, UI component 225 may generate a GUI that allows one of monitoring users 118 to select one of monitored persons 106 in order to manage deviation requests from the selected monitored person 106. In addition, UI component 225 may generate a GUI that indicates a rule as well as a requested deviation from the rule. In some instances, the GUI may include a description of the request, as provided by one of monitored persons 106 via end-user computing devices 107. UI component 225 may generate user-selectable elements that allow monitoring users 118 to authorize or deny deviation requests. FIGS. 5 and 6 illustrate examples of GUIs for managing requests for deviation from rules.

Figure 3:
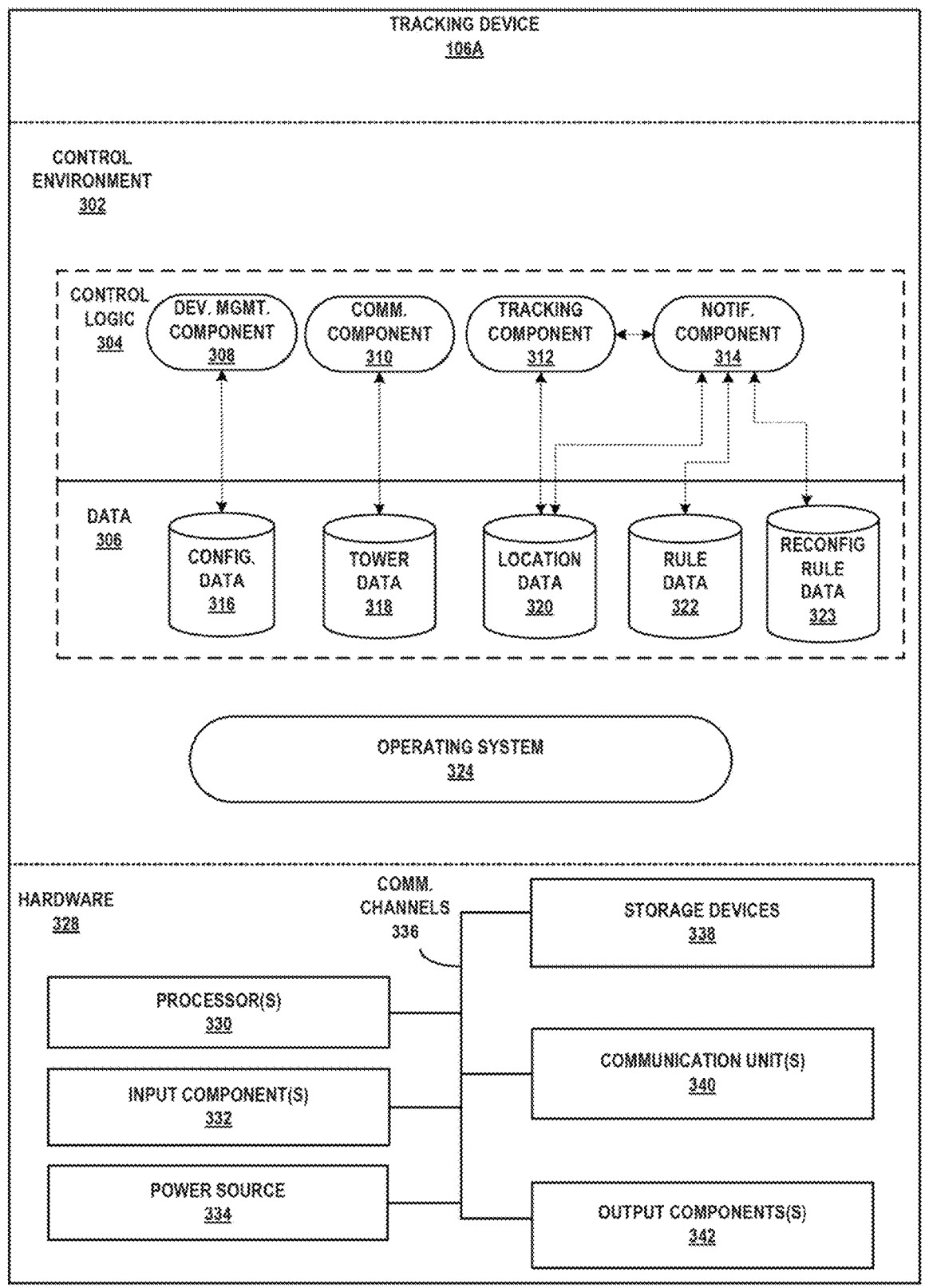
FIG. 3 is a block diagram illustrating an example tracking device, in accordance with one or more aspects of the present disclosure.

FIG. 3 is a block diagram illustrating an example tracking device, in accordance with one or more aspects of the present disclosure. FIG. 3 illustrates only one particular example of BWTD 106A, as shown in FIG. 1. Many other examples of BWTD 106A may be used in other instances and may include a subset of the components included in example BWTD 106A or may include additional components not shown BWTD 106A in FIG. 3. In some examples, BWTD 106A may run a set, subset, or superset of functionality included in control logic 304. In some examples, the external housing (not shown) of BWTD 106A may have one or more attachment components (not shown), such as straps, fasteners, magnetic materials, adhesive materials or any other mechanism or material for attaching or associating with tracking device 106A with an object to be tracked.

As shown in the example of FIG. 3, BWTD 106A may be logically divided into control environment 302 and hardware 328. Hardware 328 may include one or more hardware components that provide an operating environment for components executing in control environment 302. Control environment 302 may include operating system 324, which or may not operate with higher privileges than other components executing in user space 202.

As shown in FIG. 2, hardware 328 includes one or more processors 330, input components 332, power source 334 storage devices 338, communication units 340, and output components 342. Processors 328, input components 332, power source 334, storage devices 338, communication units 340, and output components 342 may each be interconnected by one or more communication channels 336. Communication channels 336 may interconnect each of the components 330, 332, 334, 338, 340, and 342 for inter-component communications (physically, communicatively, and/or operatively). In some examples, communication channels 336 may include a hardware bus, a network connection, one or more inter-process communication data structures, or any other components for communicating data between hardware and/or software.

One or more processors 330 may implement functionality and/or execute instructions within BWTD 106A. For example, processors 330 on BWTD 106A may receive and execute instructions stored by storage devices 338 that provide the functionality of components included in control environment 302. These instructions executed by processors 330 may cause BWTD 106A to store and/or modify information, within storage devices 338 during program execution. Processors 330 may execute instructions of components in control environment 302 to perform one or more operations in accordance with techniques of this disclosure. That is, components included in user control environment 302 may be operable by processors 330 to perform various functions described herein.

One or more input components 332 of BWTD 106A may receive input. Examples of input are tactile, audio, kinetic, and optical input, to name only a few examples. Input components 332 of BWTD 106A, in one example, include a voice responsive system, video camera, buttons, control pad, microphone or any other type of device for detecting input from a human or machine. In some examples, input component 210 may be a presence-sensitive input component, which may include a presence-sensitive screen, touch-sensitive screen, etc.

One or more output components 342 of BWTD 106A may generate output. Examples of output are tactile, audio, and video output. Output components 342 of BWTD 106A, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 106A may be integrated with BWTD 106A in some examples. In other examples, output components 342 may be physically external to and separate from BWTD 106A, but may be operably coupled to BWTD 106A via wired or wireless communication. An output component may be a built-in component of BWTD 106A located within and physically connected to the external packaging of BWTD 106A. In another example, output components 342 may be an external component of BWTD 106A located outside and physically separated from the packaging or housing of BWTD 106A. Output components 342 may provide haptic, vibratory or other tactile output.

One or more communication units 340 of BWTD 106A may communicate with external devices by transmitting and/or receiving data. For example, BWTD 106A may use communication units 340 to transmit and/or receive radio signals on a radio network such as a cellular or other wireless radio network. In some examples, communication units 340 may transmit and/or receive satellite signals on a satellite network such as a Global Positioning System (GPS) network. Examples of communication units 340 include a network interface card (e.g. such as an Ethernet card), an optical transceiver, a radio frequency transceiver, a GPS receiver, or any other type of device that can send and/or receive information. Other examples of communication units 340 may include Bluetooth®, GPS, 3G, 4G, and Wi-Fi® radios found in mobile devices as well as Universal Serial Bus (USB) controllers and the like.

One or more storage devices 338 within BWTD 106A may store information for processing during operation of BWTD 106A. In some examples, storage device 338 is a temporary memory, meaning that a primary purpose of storage device 338 is not long-term storage. Storage devices 338 on BWTD 106A may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 338, in some examples, also include one or more computer-readable storage media. Storage devices 338 may be configured to store larger amounts of information than volatile memory. Storage devices 338 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 338 may store program instructions and/or data associated with components included in control environment 302.

As shown in FIG. 2, BWTD 106A may include a power source 334. In some examples, power source 334 may be a battery. Power source 334 may provide power to one or more components of BWTD 106A. Examples of power source 334 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 334 may have a limited capacity (e.g., 1000-3000 mAh).

As shown in FIG. 2, control logic 304 executes in control environment 302 of 334. Control logic 304 may include but is not limited to: device management component (DMC) 308, communication component 310, tracking component 312, and notification component 314. Data 306 may include one or more datastores. A datastore may store data in structure or unstructured form. Example datastores may be any one or more of a relational database management system, online analytical processing database, table, or any other suitable structure for storing data.

Configuration data 316 may include one or more of: a unique identifier of BWTD 106A, a unique identifier of the monitored person to which BWTD 106A is assigned, and/or any other properties or parameters that control or change the operation of tracking device 106A. Tower data 318 may include records, tuples or sets, wherein each record, tuple or set specifies one or more of: a unique identifier of a particular tower, a latitude and longitude of BWTD 106A when BWTD 106A detected or initiated a communication session with the particular tower, a signal strength for the tower when BWTD 106A detected or initiated a communication session with the particular tower, a directional heading of BWTD 106A when BWTD 106A detected or initiated a communication session with the particular tower, and/or a timestamp when BWTD 106A detected or initiated a communication session with the particular tower.

Data 306 may include location data 320. Location data 320 may include records, tuples or sets, wherein each record, tuple or set specifies one or more of: a unique identifier of BWTD 106A and/or monitored person wearing BWTD 106A, GPS coordinates (latitude, longitude), a timestamp when the GPS coordinates (latitude, longitude) were determined, GPS receive signal strength when the GPS coordinates (latitude, longitude) were determined, signal strength of a tower when the GPS coordinates (latitude, longitude) were determined, and/or a directional heading of BWTD 106A when the GPS coordinates (latitude, longitude) were determined.

Rule data 322 may include data that defines, one or more of: a restricted location/region, a permissible location/region, a time period for permitted travel with respect to a restricted/permissible location/region, permissible/restricted users who can or cannot be within a threshold distance of the monitored person, or any other property, rule, condition, to name only a few examples.

According to aspects of this disclosure, reconfigured rule data 323 comprises reconfigured rules generated in response to a request for a deviation from one or more rules of rule data 322. For example, upon authorization by one of monitoring users 118, monitoring center 112 may push one or more reconfigured rules to tracking device 106A. Tracking device 106A may receive the reconfigured rules via communications units 340 and store the reconfigured rules as reconfigured rule data 323.

Reconfigured rule data 323 may include one or more reconfigured rules that correspond to one or more respective rules of rule data 322. Hence, reconfigured rule data 323 may include data that defines, one or more of: a restricted location/region, a permissible location/region, a time period for permitted travel with respect to a restricted/permissible location/region, permissible/restricted users who can or cannot be within a threshold distance of the monitored person, or any other property, rule, condition, to name only a few examples. The reconfigured rules of reconfigured rule data 323 may establish different limitations for characteristic data from the respective rules to which the reconfigured rules correspond.

In some examples, according to aspects of this disclosure, reconfigured rule data 323 may include timing data. For example, as described herein, reconfigured rules may be associated with a particular duration, e.g., as specified in a request for deviation. In this example, reconfigured rule data 323 may include data that represents the duration. Reconfigured rules of reconfigured rule data 323 may remain in effect for the specified duration.

In operation, DMC 308 may initially be configured with configuration data 316. For instance, DMC 308 may be programmed, from an external computing device, with a unique identifier for BWTD 106A and/or a unique identifier of the monitored person associated with or assigned to BWTD 106A. Once BWTD 106A has been configured with configuration data 316, the monitored person may move about one or more geographic regions.

Communication component 310 may initiate, manage, and terminate communication sessions with towers that provide network infrastructure. In particular, as BWTD 106A moves to different geographic regions, communication component 310 may initiate communication sessions with different towers in the different regions. In this way, communication component 310 maintains communication between BWTD 106A and monitoring center 112.

Tracking component 312 may determine the location of BWTD 106A based on signals received from GPS (or other GNSS) satellites, such as satellites 108 in FIG. 1. For instance, tracking component 312 may determine the latitude and longitude of BWTD 106A at a particular point time. Tracking component 312 may determine the latitude and longitude on a periodic basis according to an interval that may be included in configuration data 312. The time interval may be programmed by a user, dynamically changed (e.g., based on one or more detected or determined events) or hard-coded. At a point in time (e.g., when a time interval has elapsed), upon determining the latitude and longitude, tracking component 312 may generate and store a record, tuple or set that specifies one or more of: a unique identifier of BWTD 106A and/or monitored person wearing BWTD 106A, GPS coordinates (latitude, longitude), a timestamp when the GPS coordinates (latitude, longitude) were determined, GPS receive signal strength when the GPS coordinates (latitude, longitude) were determined, signal strength of a tower when the GPS coordinates (latitude, longitude) were determined, and/or a directional heading of BWTD 106A when the GPS coordinates (latitude, longitude) were determined. Tracking component 312 may send location data 320 to monitoring center 320 in real-time, periodically, or asynchronously, as described in some examples of FIG. 1.

Notification component 314 may receive notifications from external computing devices such as monitoring center 112 and/or user devices 116, as shown in FIG. 1. Notification component 314 may generate and send notifications to one or more external computing devices such as monitoring center 112 and/or user devices 116.

In some examples, notifications generated by notification component 314 may be based on rule data 322 and reconfigured rule data 323. For instance, if a rule or condition specified in rule data 322 is satisfied by a GPS coordinate determined by tracking component 312, then notification component 314 may send a notification to one or more of monitoring center 112 and/or user devices 116. In some examples, if a rule or condition specified in rule data 322 is satisfied by a GPS coordinate determined by tracking component 312, then notification component 314 may cause one or more of output components 342 to provide an alert, such as haptic, audio, or visual feedback. In some examples, in response to receiving a notification from an external computing device, notification component 314 may cause one or more of output components 342 to provide an alert, such as haptic, audio, or visual feedback.

According to aspects of this disclosure, notifications generated by notification component 314 may additionally or alternatively be based on reconfigured rule data 323. For example, in instances in which tracking device 106A has been configured to incorporate reconfigured rule data 323, notification component 314 may enforce the reconfigured rule rather than the initial rule (of rule data 322) to which the reconfigured rule corresponds. That is, if a rule or condition specified in reconfigured rule data 323 is satisfied by a GPS coordinate determined by tracking component 312, then notification component 314 may send a notification to one or more of monitoring center 112 and/or user devices 116. In some examples, if a rule or condition specified in reconfigured rule data 323 is satisfied by a GPS coordinate determined by tracking component 312, then notification component 314 may cause one or more of output components 342 to provide an alert, such as haptic, audio, or visual feedback. In some examples, in response to receiving a notification from an external computing device, notification component 314 may cause one or more of output components 342 to provide an alert, such as haptic, audio, or visual feedback. In this way, notification component 314 may enforce reconfigured rules. Notification component 314 may continue to determine whether any other property, rule, condition of reconfigured rule data 323 is satisfied for a duration specified by reconfigured rule data 323.

FIG. 4 is an illustration of a graphical user interface generated for display by a computing device, in accordance with techniques of this disclosure. In some examples, the graphical content shown in the example of FIG. 4 may be hosted by monitoring center 112 for presentation by end-user devices 107 (FIG. 1). In other examples, end-user devices 107 may include a native application for generating the graphical content.

In any case, FIG. 4 generally illustrates one example of a GUI for requesting a deviation from a rule. In this case, the request is for a schedule deviation. The initial rule requires one of monitored persons 106 (FIG. 1) to be physically located at a particular geographical location (work) from 8:00 AM to 5:30 PM on Monday, Tuesday, Wednesday, Friday and Saturday. In the example shown in FIG. 4, monitored person 106 requests a deviation from the schedule in order to shift the hours to 9:00 AM to 6:30 PM due to a change in work scheduling. The GUI includes a representation of the initial rule (solid shaded bars) as well as the reconfigured rule (minus signs and plus signs). The GUI also includes a field for comments into which monitored person 106 may enter an explanation for deviation.

FIG. 5 is an illustration of another graphical user interface generated for display by a computing device, in accordance with techniques of this disclosure. According to aspects of this disclosure, the graphical content shown in the example of FIG. 5 may be generated by UI component 225 (FIG. 2). For example, graphical content shown in the example of FIG. 5 may be generated by monitoring center 112 for presentation by user devices 116 (FIG. 1).

The example generally includes a listing of monitored persons 106 that may be monitored by one of monitoring users 118. Upon selection of a particular monitored person 106, monitoring center 112 may generate a list or a queue of rule deviation requests for the selected monitored person 106. Comments associated with the request for deviation may also be displayed for review by monitoring users 118.

FIG. 6 is an illustration of another graphical user interface generated for display by a computing device, in accordance with techniques of this disclosure. According to aspects of this disclosure, the graphical content shown in the example of FIG. 6 may be generated by UI component 225 (FIG. 2). For example, graphical content shown in the example of FIG. 6 may be generated by monitoring center 112 for presentation by user devices 116 (FIG. 1).

The content in the example of FIG. 6 generally corresponds to the request shown in FIG. 4. That is, FIG. 6 generally illustrates one example of a GUI for approving or denying a request for a schedule deviation. Again, the initial rule requires one of monitored persons 106 (FIG. 1) to be physically located at a particular geographical location (work) from 8:00 AM to 5:30 PM on Monday, Tuesday, Wednesday, Friday and Saturday. In the example shown in FIG. 6, monitored person 106 requests a deviation from the schedule in order to shift the hours to 9:00 AM to 6:30 PM due to a change in work scheduling. The GUI includes a representation of the initial rule (solid shaded bars) as well as the reconfigured rule (minus signs and plus signs). The GUI also includes a field for comments into which monitored person 106 may enter an explanation for deviation, as well as a field for comments into which monitoring users 118 may enter an explanation for approval or denial of a request. Monitoring users 118 may approve or deny a request by selecting the appropriate user-selectable graphical element ("approve request" or "deny request").

Figure 7:
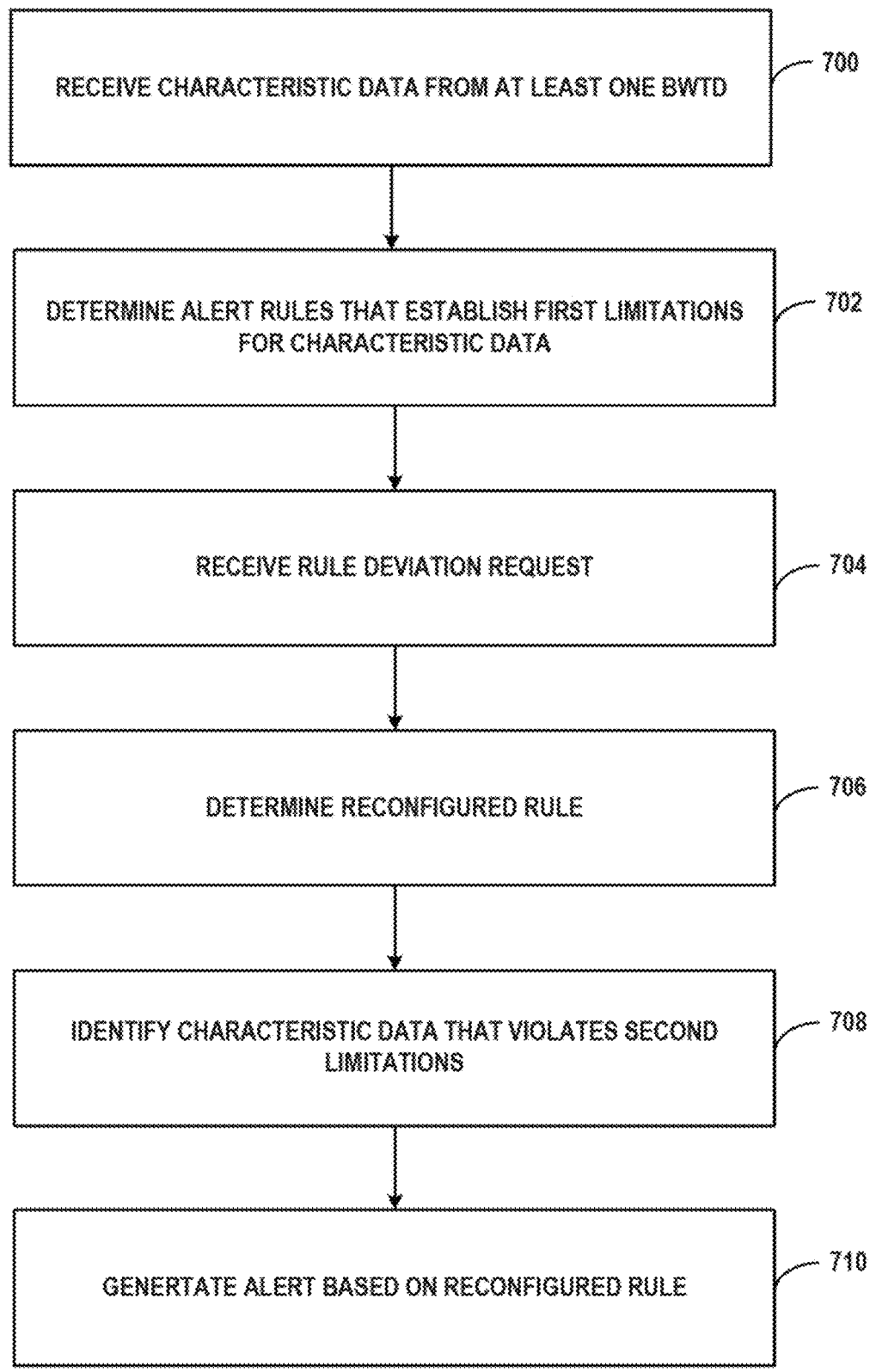
FIG. 7 is a flow diagram illustrating example operations of a computing device configured to determine a reconfigured rule in response to a request for deviation from a rule, in accordance with techniques of this disclosure.

FIG. 7 is a flow diagram illustrating example operations of a computing device configured to determine a reconfigured rule in response to a request for deviation from a rule, in accordance with techniques of this disclosure. While described with respect to the system shown in FIG. 1, it should be understood that the process described with respect to FIG. 7 may be carried out by a variety of other computing systems.

In the illustrated example, monitoring center 112 may receive, from at least one of BWTDs 106 (BWTDs 106A, for purposes of example), characteristic data that indicates one or more characteristics of BWTD 106A (700). As described herein, the characteristic data may include any data from BWTDs 106 that indicates a trait, quality, or property of BWTDs 106 and/or monitored persons 104. For example, BWTDs 106 may generate characteristic data that indicates a unique identifier of BWTDs 106 and/or monitored persons 104, a geo-location of BWTDs 106 (e.g., GPS coordinates), a time at which location data is gathered (e.g., timestamp data), a GPS receive signal strength, a signal strength of a communication tower, a directional heading, a speed, whether BWTDs 106 are at rest, an ambient temperature in which BWTDs 106 are located, whether BWTDs 106 are in motion without a GPS signal, whether a housing or tamper-resistant strap of BWTDs 106 has been tampered with, or the like.

Monitoring center 112 may also determine a set of alert rules associated BWTD 106A (702). The set of alert rules may establish first limitations for the characteristic data that cause a first alert to be generated when the characteristic data violates the first limitations. In some instances, the set of alert rules may correspond to conditions for release or parole.

Monitoring center 112 may receive a rule deviation request to deviate from at least one rule of the set of rules (704). For example, one of monitored persons 106 may send a request to deviate from a rule to monitoring center via an interface at one of end-user computing devices 107. The rule deviation request may specify a duration for deviation from the at least one rule. Based on the rule deviation request, monitoring center 112 may determine a reconfigured rule corresponding to the at least one rule (706). The reconfigured rule may establish second limitations for the characteristic data that are different from the first limitations for the duration.

During the duration, monitoring center 112 may identify characteristic data that has been received from BWTD 106A that violates the first limitations established by the set of alert rules (708). However, monitoring center 112 may suppress notifications or alerts based on the reconfigured rule (710). That is, despite the received characteristic data violating the first limitations, monitoring center 112 may not generate any alerts and may instead enforce limitations associated with the reconfigured rule.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A system comprising:
    at least one body-worn tracking device (BWTD) configured to transmit characteristic data that indicates one or more characteristics of the at least one BWTD;
    a computing system configured to communicate with the at least one BWTD and an end-user computing device associated with a user of the at least one BWTD, the computing system comprising:
        a memory configured to store a set of alert rules associated with the at least one BWTD, wherein the set of alert rules establish first limitations for the characteristic data such that the computing system generates a first alert when the characteristic data violates the first limitations;
        a communication unit configured to receive, from the end-user computing device, a rule deviation request to deviate from at least one rule of the set of rules, wherein the rule deviation request specifies a duration for deviation from the at least one rule; and
        one or more processors configured to:
            determine, based on the rule deviation request received by the communication unit, a reconfigured rule corresponding to the at least one rule, wherein the reconfigured rule establishes second limitations for the characteristic data that are different from the first limitations for the duration;
            identify characteristic data that has been received from the at least one BWTD during the duration that violates the second limitations; and
            generate, based on the reconfigured rule, an alert for the identified characteristic data,
        wherein the characteristic data comprises temporal data and location data,
        wherein the first limitations comprise first temporal and geographic limitations such that the computing system generates the first alert when the temporal data and the location data indicates that the at least one BWTD is not located within a predetermined geographical area at a predetermined time, and
        wherein to determine the reconfigured rule, the one or more processors are configured to establish second temporal and geographic limitations comprising a second predetermined geographical area or a second predetermined time.

2. The system of claim 1, wherein the one or more processors are configured to store the reconfigured rule to the memory, and wherein the one or more processors are further configured to, after the duration, clear the reconfigured rule from the memory or mark the reconfigured rule as inactive in the memory.

3. The system of claim 1,
    wherein the characteristic data comprises location data,
    wherein the first limitations comprise first geographic limitations such that the computing system generates the first alert when the location data indicates that the at least one BWTD is outside of a predetermined geographical area or the at least one BWTD is proximate to a geographical location of interest, and
    wherein to determine the reconfigured rule, the one or more processors are configured to establish second geographic limitations comprising a second predetermined geographical area or a second geographical location of interest.

4. The system of claim 1,
    wherein the characteristic data comprises communication status data that indicates a communication status between a first component of the at least one BWTD to a second component of the at least one BWTD,
    wherein the first limitations comprise first communication status limitations such that the computing system generates the first alert when the communication status data indicates that the first component is not in communication with the second component, and
    wherein to determine the reconfigured rule, the one or more processors are configured to establish second communication status limitations that permit a break in communication between the first component and the second component.

5. The system of claim 1,
    wherein the characteristic data comprises battery status data that indicates a battery charge status of a battery of the at least one BWTD,
    wherein the first limitations comprise first battery status limitations such that the computing system generates the first alert when the battery status data indicates that the battery charge status of the battery is lower than a threshold amount,
    wherein to determine the reconfigured rule, the one or more processors are configured to establish second battery status limitations that permit a battery charge status that is lower than the threshold amount.

6. The system of claim 1,
    wherein the characteristic data comprises communication link data that indicates whether the at least one BWTD has established communication link to a communication network,
    wherein the first limitations comprise first communication link limitations such that the computing system generates the first alert when the communication link data indicates that the at least one BWTD does not have a communication link to a communication network,
    wherein to determine the reconfigured rule, the one or more processors are configured to establish second communication link limitations that permit the at least one BWTD to not have a communication link to a communication network.

7. The system of claim 1, wherein the one or more processors are configured to generate a graphical user interface (GUI) that indicates the at least one rule and the reconfigured rule,
    wherein the one or more processors are further configured to generate the GUI to indicate a description of the second limitations, the description received from the end-user computing device.

8. The system of claim 1,
    wherein the one or more processors are configured to generate a GUI that includes a user-selectable authorization element for authorization of the reconfigured rule,
    wherein, prior to determining the reconfigured rule, the one or more processors are configured to determine that the reconfigured rule has been authorized based on input provided at the user-selectable authorization element.

9. The system of claim 1, wherein the one or more processors are further configured to:
    identify second characteristic data that has been received from the at least one BWID during the duration that violates the first limitations established by the set of alert rules; and
    suppress, based on the reconfigured rule, the first alert for the identified second characteristic data such that the computing system does not generate the first alert.

10. A method comprising:
receiving, by a computing device and from at least one body-worn tracking device (BWTD), characteristic data that indicates one or more characteristics of the at least one BWTD;
determining a set of alert rules associated with at the least one BWTD, wherein the set of alert rules establish first limitations for characteristic data that cause a first alert to be generated when the characteristic data violates the first limitations;
receiving a rule deviation request to deviate from at least one rule of the set of rules, wherein the rule deviation request specifies a duration for deviation from the at least one rule;
determining, based on the rule deviation request, a reconfigured rule corresponding to the at least one rule, wherein the reconfigured rule establishes second limitations for the characteristic data that are different from the first limitations for the duration;
identifying characteristic data that has been received from the at least one BWTD during the duration that violates the second limitations; and
generating, based on the reconfigured rule, an alert for the identified characteristic data, wherein the characteristic data comprises temporal data and location data,
wherein the first limitations comprise first temporal and geographic limitations such that the first alert is generated when the temporal data and the location data indicates that the at least one BWTD is not located within a predetermined geographical area at a predetermined time, and
wherein determining the reconfigured rule comprises establishing second temporal and geographic limitations comprising a second predetermined geographical area or a second predetermined time.

11. The method of claim 10, further comprising:
storing the reconfigured rule to a memory; and
after the duration, clearing the reconfigured rule from the memory or marking the reconfigured rule as inactive in the memory.

12. The method of claim 10,
wherein the characteristic data comprises communication status data that indicates a communication status between a first component of the at least one BWTD to a second component of the at least one BWTD,
wherein the first limitations comprise first communication status limitations such that the first alert is generated when the communication status data indicates that the first component is not in communication with the second component, and
wherein determining the reconfigured rule comprises establishing second communication status limitations that permit a break in communication between the first component and the second component.

13. The method of claim 10,
wherein the characteristic data comprises battery status data that indicates a battery charge status of a battery of the at least one BWTD,
wherein the first limitations comprise first battery status limitations such that the first alert is generated when the battery status data indicates that the battery charge status of the battery is lower than a threshold amount,
wherein determining the reconfigured rule comprises establishing second battery status limitations that permit a battery charge status that is lower than the threshold amount.

14. The method of claim 10,
wherein the characteristic data comprises communication link data that indicates whether the at least one BWTD has established communication link to a communication network,
wherein the first limitations comprise first communication link limitations such that the first alert is generated when the communication link data indicates that the at least one BWTD does not have a communication link to a communication network,
wherein determining the reconfigured rule comprises establishing second communication link limitations that permit the at least one BWTD to not have a communication link to a communication network.

15. The method of claim 10, further comprising generating a graphical user interface (GUI) that indicates the at least one rule and the reconfigured rule.

16. The method of claim 15, further comprising generating the GUI to indicate a description of the second limitations, the description received from the end-user computing device.

17. The method of claim 10, further comprising:
generating a GUI that includes a user-selectable authorization element for authorization of the reconfigured rule; and
prior to determining the reconfigured rule, determining that the reconfigured rule has been authorized based on input provided at the user-selectable authorization element.

18. The method of claim 10, further comprising:
identifying second characteristic data that has been received from the at least one BWTD during the duration that violates the first limitations established by the set of alert rules; and
suppressing, based on the reconfigured rule, the first alert for the identified second characteristic data such that the computing device does not generate the first alert.

19. The method of claim 10,
wherein the characteristic data comprises location data,
wherein the first limitations comprise first geographic limitations such that the first alert is generated when the location data indicates that the at least one BWTD is outside of
a predetermined geographical area or the at least one BWTD is proximate to a geographical location of interest, and
wherein determining the reconfigured rule comprises establishing second geographic limitations comprising a second predetermined geographical area or a second geographical location of interest.

* * * * *